March 23, 1926. 1,578,145
A. H. LEIPERT
CUSHION CONNECTION FOR VEHICLE CONSTRUCTION
Filed Sept. 5, 1924
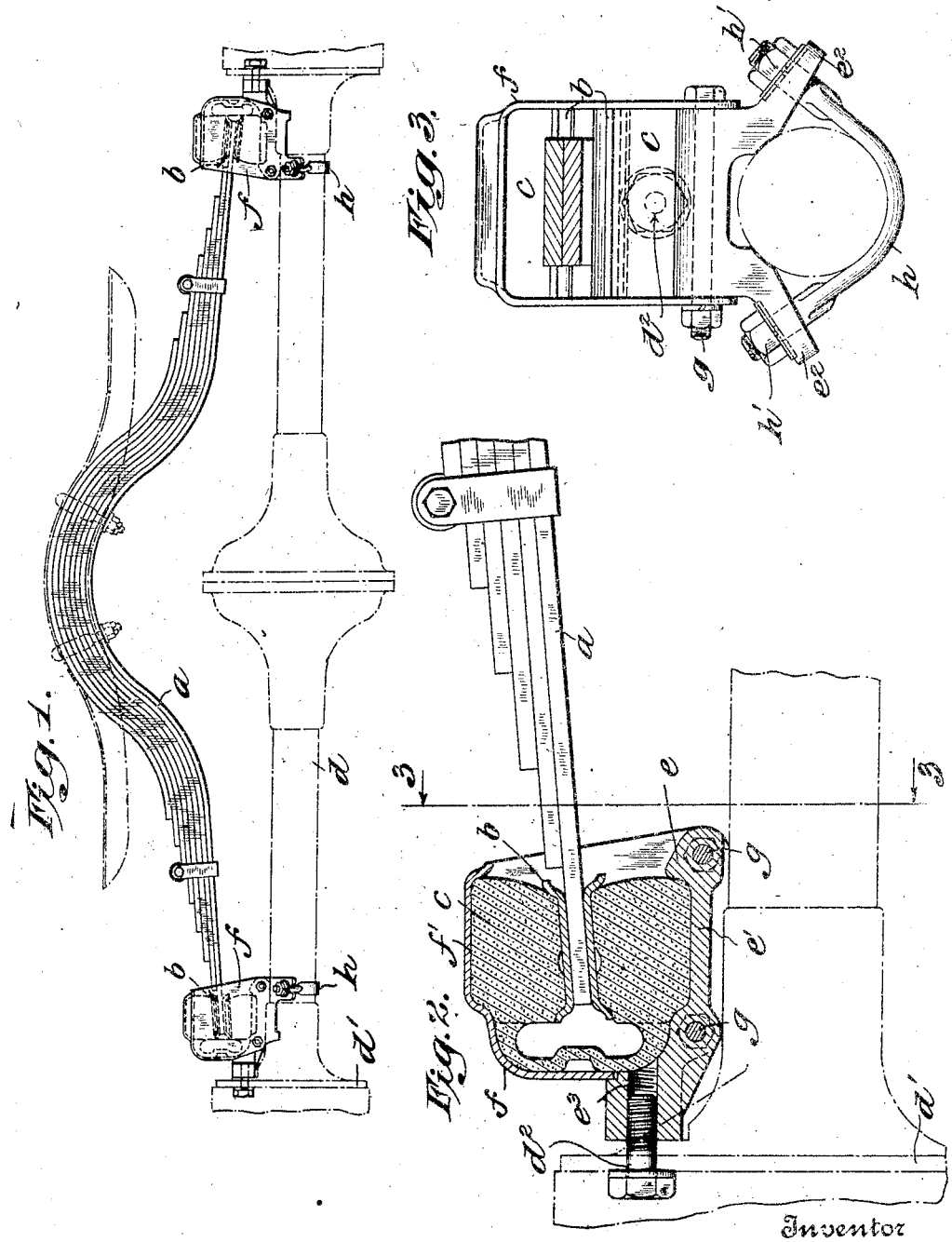
Inventor
August H. Leipert
By his Attorneys Patented Mar. 23, 1926.

1,578,145

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

CUSHION CONNECTION FOR VEHICLE CONSTRUCTION.

Application filed September 5, 1924. Serial No. 736,021.

*To all whom it may concern:*

Be it known that I, AUGUST H. LEIPERT, a citizen of the United States, residing at College Point, in the borough of Queens, of the city of New York, in the State of New York, have invented certain new and useful Improvements in Cushion Connections for Vehicle Construction, of which the following is a specification, reference being had to the accompanying drawing, forming a part hereof.

This invention relates to improvements in non-metallic yielding connections for vehicle springs and particularly the means for associating such connections with a cross spring such as are found, for instance, on Ford cars. The principal object of the invention is to provide means which are of simple and inexpensive construction and lend themselves to ready application to the axles of cars without modifying the construction thereof. A further object is to provide a simple form of housing for the cushion connections which may be mounted fixedly in place on the rear axle of a Ford car and engaged by standard devices thereon to prevent movement with respect to the axle both rotarily and laterally. The invention will be described in greater detail in connection with the illustrated embodiment shown in the drawings, wherein:

Figure 1 is a view in rear elevation of a cross spring having cushion connections applied to its ends and secured in place on the rear axle of a car which is indicated conventionally in dotted lines.

Figure 2 is a detailed view in section showing the connection at one end of said vehicle spring.

Figure 3 is a view in transverse section through the spring and axle and taken on the plane indicated by the line 3—3 of Figure 2 and looking in the direction of the arrows.

As the description proceeds it will be evident that this invention is not concerned primarily with the nature of the devices entering into the assembly of the cushion connections since these parts are now generally known to the art. Further, while the illustration and description are referable to the rear end of a Ford car this embodiment is used as a basis more by way of exemplification than by limitation since one skilled in the art may make such modifications in the design as may be appropriate to the peculiarity of any spring and axle with which he is dealing. As shown, the cross spring $a$ carries at its ends seats $b$ for blocks $c$ of non-metallic yielding material which are to be confined within a housing secured on the axle $d$. This housing in the illustrated embodiment includes a forging $e$ having a seat $e'$ provided therein for one column of the material $c$, and a stamped metal body $f$ which wholly encloses the material $c$ and may be secured in place on the base $e$ by through bolts $g$, as will be clear. The stamping $f$ is of such size and configuration as to extend downwardly at opposite sides of the base $e$ for engagement by the bolts $g$ and to afford exteriorly a seat $f'$ for one column of the material $c$. It is now the practice to assemble the parts with the non-metallic material under compression and the construction described permits this to be done. The problem presented is to secure the housing in place on the axle $d$ by such means as will hold the housing against relative movement. Further, it is, of course, desirable to employ such standard means as may be associated with the axle to accomplish this end. In a Ford car, for instance, flange $d'$ is formed with the axle and the usual shackle is anchored to this flange. In the illustrated embodiment the forging $e$ is formed with downwardly and outwardly extending flanges $e^2$ on which the base may rest when applied to the axle. The end of the forging is tapped as at $e^3$ to receive a retaining bolt $d^2$ passing through the flange $d'$. This bolt $d^2$ or the equivalent is associated with flange $d'$ in standard construction to anchor the shackle. A U-bolt $h$ embraces the axle and is secured to the flanges $e^2$ on the base by nuts $h'$, this retaining strap or bolt co-operating with the anchoring bolt $d^2$ to clamp the housing onto the axle and hold it against both rotative and lateral movements. Only one of the housings has been described since in the other the parts are duplicated as will be evident.

Changes in details of design and in the particular form of the means employed may be made without departing from the principle of the proposal.

What I claim is:

1. In combination with a cross spring in substantial parallelism with a vehicle axle, cushion connections interposed operatively between the ends of the spring and the axle and including housings engaged with the axle, and means substantially parallel to the axle engaging the housing and holding it against displacement, independent means embracing the axle and engaged with the housing to clamp it in place.

2. In combination with a cross spring in substantial parallelism with a vehicle axle, cushion connections interposed operatively between the ends of the spring and the axle and including housings engaged with the axle, each housing including a base, radial flanges carried with the axle in juxtaposition to said housings, means carried with the bases to center the houses on the radial flanges, and means carried with the axle and engaging the bases at their ends to hold the houses against displacement.

3. In combination with a cross spring in substantial parallelism with a vehicle axle. cushion connections interposed operatively between the ends of the spring and the axle and including housings engaged with the axle, each housing including a base, radial flanges carried with the axle in juxtaposition to said housings, means carried with the bases to center the housings on the axle, means carried with the radial flanges and engaging the bases at their ends to hold the housings against displacement, flanges carried with the base and extending transversely of the axle and means to secure the flanges and base to the axle.

This specification signed this 3rd day of September A. D. 1924.

AUGUST H. LEIPERT.